(12) United States Patent
Carlos

(10) Patent No.: US 7,810,076 B2
(45) Date of Patent: Oct. 5, 2010

(54) METHOD AND SYSTEM FOR SCALING STANDALONE APPLICATIONS TO BE EXECUTED AS INTERNET APPLICATIONS

(75) Inventor: Cohan Sujay Carlos, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 11/534,523

(22) Filed: Sep. 22, 2006

(65) Prior Publication Data

US 2008/0127158 A1    May 29, 2008

(51) Int. Cl.
*G06F 9/44*    (2006.01)
(52) U.S. Cl. ............... 717/130; 717/114; 717/115; 717/116; 717/108; 717/110
(58) Field of Classification Search ............ 717/130
See application file for complete search history.

(56) References Cited

U.S. PATENT DOCUMENTS

| | | | |
|---|---|---|---|
| 5,870,753 A * | 2/1999 | Chang et al. | 707/103 R |
| 6,504,554 B1 * | 1/2003 | Stone et al. | 715/760 |
| 7,500,077 B2 * | 3/2009 | Krauss | 711/170 |
| 7,552,308 B2 * | 6/2009 | Litke | 711/202 |
| 2004/0078782 A1 * | 4/2004 | Clement et al. | 717/116 |

\* cited by examiner

*Primary Examiner*—Thomas K Pham
(74) *Attorney, Agent, or Firm*—Lee Law, PLLC; Christopher B. Lee

(57) ABSTRACT

An invention is disclosed for a programming method and system for "passivating" (i.e., temporarily removing) processed data elements from memory in order to make the affected memory available for other processing tasks, thereby improving the "scalability" of a standalone object-oriented application program in accommodating large quantities of users and/or data without completely occupying memory when such a program is deployed as a network or internet-based web application. Specifically, the invention includes programming steps for allowing memory resources allocated to a user of the program to be "freed up", i.e., temporarily made available to other users and/or programs and then reclaimed when again required by the original user.

20 Claims, 4 Drawing Sheets

METHOD AND SYSTEM FOR SCALING STANDALONE APPLICATIONS TO BE EXECUTED AS INTERNET APPLICATIONS

TECHNICAL FIELD

This invention relates to use of a technique for converting standalone Java application programs normally operated on a local host computer so that they can be run as network or internet-based web applications, by providing a programming model for making the standalone program scalable, and tools that allow it to be operated on a network or internet web server.

BACKGROUND

"Object-oriented" computer programming (OOP) involves the use of programming languages and techniques that are based on the concept of an "object", which is a "data structure" (or abstract programming mechanism) for encapsulating data to be used by a set of routines (or "methods") that process the data. These methods perform operations on the data contained within all objects that are instances of a particular "class". Each object class has a position in a "class hierarchy" that progressively defines unique characteristics or attributes for the data contained in the objects of its class(es), and methods or code in one class can be "passed down" the hierarchy to be inherited by a "subclass" from a "superclass". A "procedure call" is described as "invoking a method" to operate on (i.e., process the data contained in) an object, by identifying the method as associated with that object class to determine how to perform that operation on the given object, and if the method is not defined for that object class then an attempt is made to identify it in each of the superclasses within that class hierarchy. The programming interface providing access to the data contained in an object is well defined to allow the code implementing a method to be changed as long as the interface remains the same.

"Java" is an object-oriented general purpose programming language developed to support use of distributed platform-independent applications. Java generates an architecture-neutral object file that is executable on any computer processor supporting the Java system, so that its programs can be run independently (or in a "stand-alone" manner) on personal computers (PCs) in both individual and network applications (including those using the internet). Java has an extensive library of routines providing portable interfaces for internet-based client-server computer communications protocols such as Transmission Control Protocol over Internet Protocol (TCP/IP) and including Hypertext Transfer Protocol (HTTP) and File Transfer Protocol (FTP), in order to allow a program application to access an object across the internet via use of a Uniform Resource Locator (URL) specifying the world-wide-web ("www") address defining the location of the server storing (or "hosting") the object.

Most internet-based "web" application program models and technologies are based on the Common Gateway Interface (CGI) standard. Such programming is centered around a single entry point (i.e., the HTTP request); for example Java "servlets", PHP hypertext preprocessors and "Java server pages" (JSP). A much simpler programming model than CGI and one that offers higher productivity is that used with "standalone" programs (such as Eclipse IDE) which use a much richer processing "event structure" and also treat computer graphical user interface (GUI) elements as easily accessible and modifiable program objects. However, standalone programs have scalability issues when deployed on web-servers as web applications. When a browser client connects to a web server to request use of a standalone application program, user interface data objects are created to service the request, but these objects are generally not automatically returned to a "pool" (i.e., collected for reuse) or taken out of memory after processing of the request, which causes an object to occupy system memory for a duration greater than that required for processing its associated HTTP request(s). CGI applications normally do not have this problem since they release use of all memory between requests, but the price paid with CGI is a less coherent object-oriented programming model. These are the limitations of the prior art that are eliminated by the invention as described below.

The invention improves the "scalability" of deployment tools for converting standalone application programs normally operated on a local host computer so that they can be run as network or internet-based web applications that accommodate large numbers of users. In such tools, the application program is located (i.e., resides and runs) on a host server that is accessible over the internet or another computer network, and the interactions between a user and the application program take place in a manner that is unnoticeable (or "transparent") to both the user and the programmer of the standalone application. This invention enhances a system that allows a standalone application program to be converted into an internet-based web application with no changes, thereby greatly improving the turnaround time for rapid prototyping. Although the invention is described herein as preferably being applicable to Java programming, it also applies to other programming languages that support the concept(s) of structures or objects, such as Smalltalk; C++; C; Objective-C; Ruby; Python; Perl; PHP or C#.

SUMMARY OF THE INVENTION

An invention is disclosed for a programming method and system for "passivating" (i.e., temporarily removing) processed data elements from memory in order to make the affected memory available for other processing tasks, thereby improving the "scalability" of standalone object-oriented (including Java) application program(s) in accommodating large quantities of users and/or data without completely occupying memory when such a program is deployed as a network or internet-based web application. Specifically, the invention includes programming steps for allowing memory resources allocated to a user of the program to be "freed up", i.e., temporarily made available to other users and/or programs and then reclaimed when again required by the original user. The invention also allows the graphical user interface (GUI) of a standalone Java application program (or a program written in another object-oriented or object-based or virtual-machine interpreted language) to be displayed to a large number of users in any standard "web browser" software program (or other client program) commonly used with independent or networked personal computer (PC) systems to obtain information over the internet.

It is therefore an object of the present invention to overcome the disadvantages of the prior art in allowing a large number of users to concurrently access a standalone object-oriented program running as a network or internet-based application, by providing a programming model for "passivating" (i.e., temporarily removing) processed data elements from memory in order to make the affected memory available for other processing tasks, thereby improving the "scalability" of the program in accommodating large quantities of data without completely occupying memory It is another object of the present invention to overcome the disadvantages of the prior art in allowing a large number of users to concurrently access a standalone Java program running as a network or internet-based application, by providing programming steps for permitting memory resources allocated to a user of the program to be temporarily made available to other users and/or programs and then reclaimed when again required by the original user or program.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

DETAILED DESCRIPTION OF THE PREFERRED EMBODIMENTS

In a preferred embodiment of the tools that the invention enhances, the web-based application program is written as a standalone Java program using a prior art "abstract window toolkit" (AWT) or "simple window toolkit" (SWT) to implement the set (or "library") of commands for operating the user interface, so that it can be run by multiple users simultaneously each from an individual PC. The user interface is displayed (or "rendered") by the web-browser(s) of the user(s) connected to the web server operating the application program, instead of being directly displayed by the operating system (OS) of the individual PC, using a modified Java-based library that converts the required user input/output (I/O) manipulations into commands that can be transmitted over a network.

Figure 1:
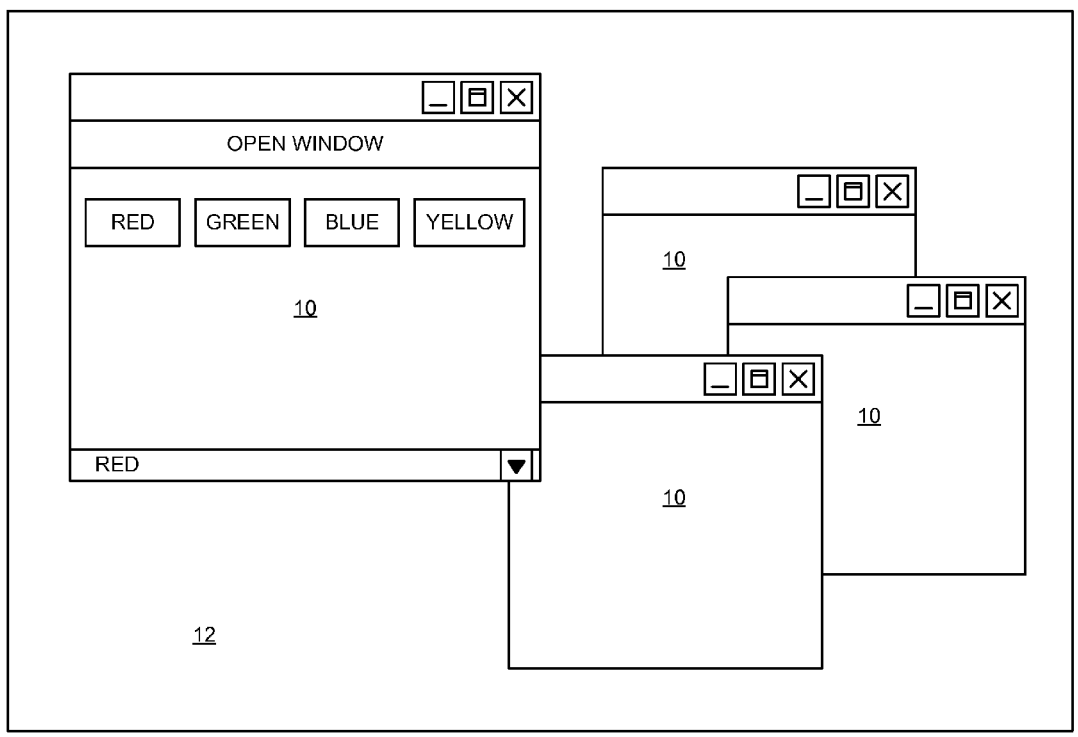
FIG. 1 is an illustration of a prior art version of a Java application program using a Microsoft Windows® graphical user interface.
Figure 2:
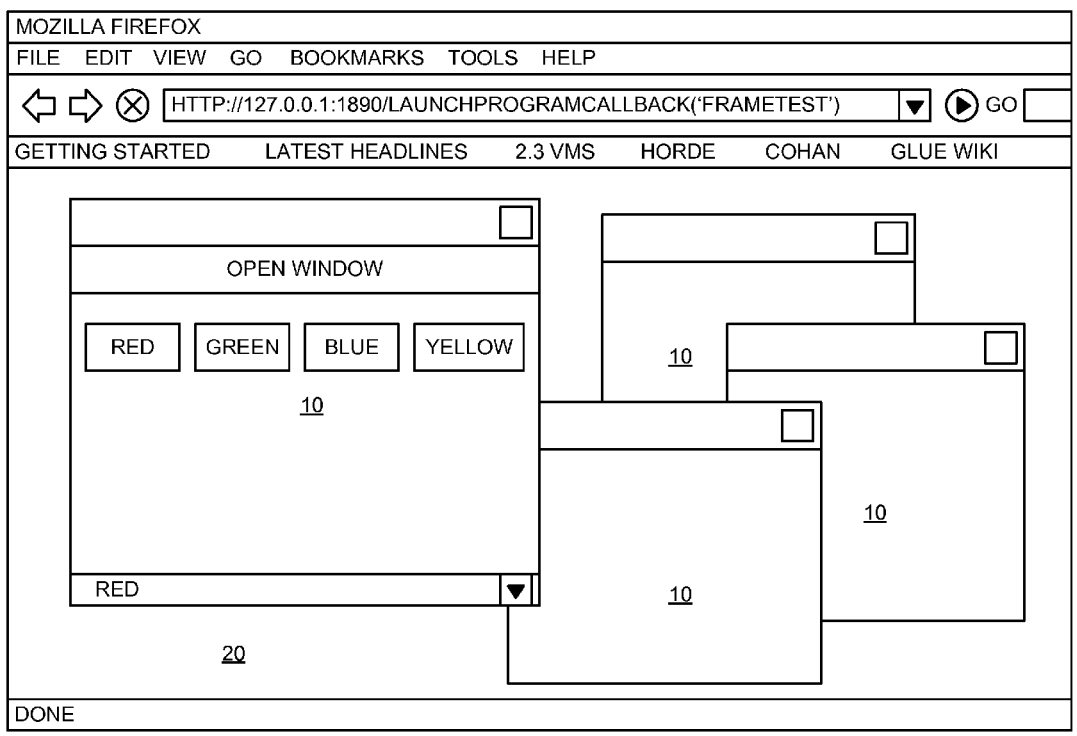
FIG. 2 is an illustration of a Java application program displayed by a web browser user interface.

FIG. 1 is an illustration of a prior art version of a Java application program 10 using a Microsoft Windows® graphical user interface 12, while a preferred embodiment of the invention as shown in FIG. 2 illustrates the same program displayed by a web browser user interface 20. When a web browser client 20 operated by a local user PC requests a URL address to identify the internet location of the server 30 hosting the desired application program 10, the web server 30 uniquely links or ("maps") this URL address to the program (preferably written as a standalone program using Java programming techniques) which is then run from the server. The list of locations that the Java Virtual Machine (JVM) searches in identifying standard libraries or "boot class-path(s)" of the requested application program contains a modified SWT or AWT library instead of the standard JVM library to allow the modified library to be used instead of the normal library used by a JVM. This modified Java-based library generates user interface commands in an "abstraction language" implemented by use of extensible markup language ("xml") or other suitable internet messaging formats that allows a Java-script library to combine them with a suitable "skin" to display their output in the GUI of the web browser (by using a suitable Javascript library and user interface look-and-feel templates) after those commands are returned to the browser and then fed to the Javascript library for execution.

In a preferred embodiment such as that shown in FIG. 2, a prior art program such as the following can be executed to open a Java-based application program 10 in a web browser GUI window 20:

```
import java.awt.*;
public class SimpleWindow {
    public static void main(String argv[ ]) {
        Frame f = new Frame( );
        f.setBounds(10,10,300,400);
        f.setBackground (Color.yellow);
        f.setVisible(true);
    }
}
```

This program uses the AWT library to perform several functions upon program execution; such as initializing a display context, creating a native frame, setting its bounds, etc. These operations are converted into a command sequence such as the following:

```
Display_New ( '218906d8')
Shell New ('218909c8', '218906d8', 27)
Control_SetBounds ('218909c8', 10, 10, 300, 400)
Control_SetVisible ('218909c8', 0)
Control_SetBackground ('218909c8', '#ffff00')
Control_SetVisible ( '218909c8', 1)
```

When the frame's setVisible(true) program method is "called" (resulting in a Control_SetVisible command being added to the sequence) all commands stored (or "queued") up to that point are sent in a stream as the response to the browser's call. These commands are fed by the browser to a Javascript library, which interprets them using a standard Javascript "eval" command since the commands are European Computer Manufacturers Association (ECMAScript) conformant. In this example, the browser displays a frame with a yellow background. In order to scale the application program for internet-based use, it must preferably adhere to the constraint that none of its Java objects has any "object state", i.e., the classes in the program do not contain any member variables that are not "final". All variables are initiated using the default constructor. Thus the current state of the application program is stored entirely in the AWT library or in a middleware or persistence solution like J2EE (Java 2 Enterprise Edition); Spring; JDO (Java Data Objects); JDBC; etc. These stateless object classes act as a set of "connectors" between the model (e.g., J2EE) and the user interface view (e.g., AWT). These AWT user interface objects are accessible to the application program as parameters passed to "event handler" objects or through use of a "helper" class to store an AWT object under an "identification key" and then access it later using the same key. An interface with such a helper object storage class can potentially be implemented as follows (or through use of generic programming):

```
interface Store {
    public void setObject(String key, Object payload);
    public Object getObject(String key);
}
```

The application program can also scale if certain classes are stateless (i.e., those containing main methods and all event handler classes). There are no restrictions on any of the other classes in the program.

Figure 3:
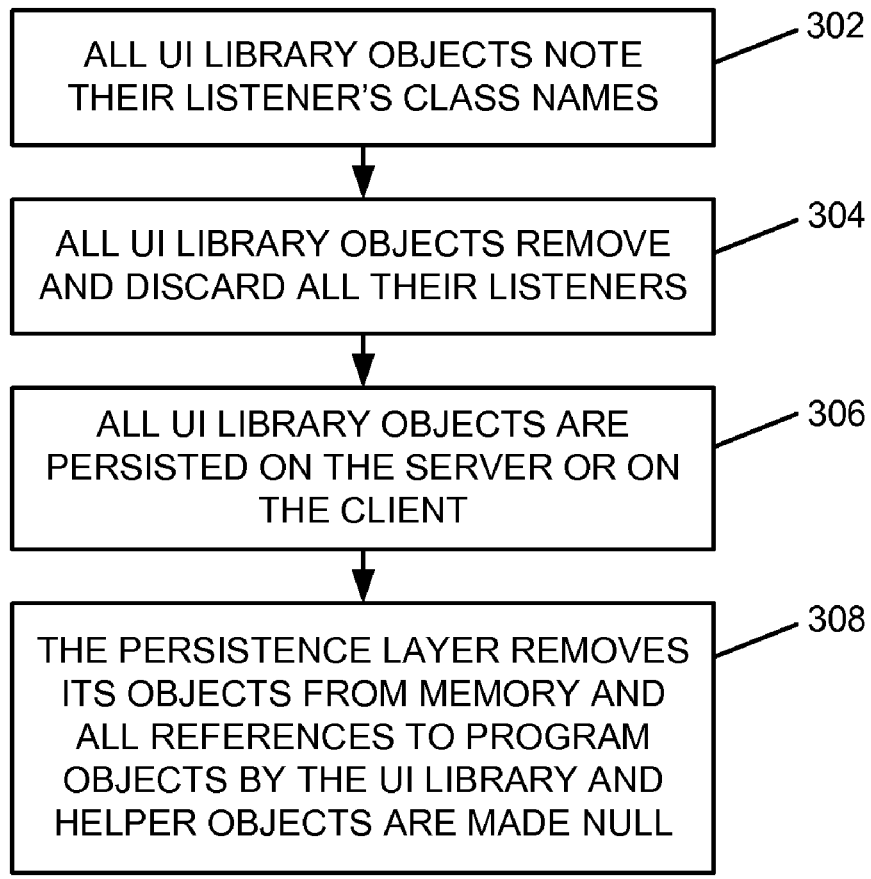
FIG. 3 and FIG. 4 are flowcharts depicting the passivation scheme of the invention.

As shown in the flowchart 300 of FIG. 3, the following events take place when objects are removed from memory (i.e., "passivated"): (i) the AWT or SWT or other UI library objects remove all "listener objects" while noting their class names (step 302) so that they can be recreated upon reactivation (this will not affect functioning of the program since no classes have a variable or "non-fixed" state); (ii) the AWT or SWT or other UI library objects are removed from memory (step 304) as explained herein; (iii) the J2EE objects are removed from memory (step 306) (or "placed in a passive state") by the J2EE container (or if other persistence methods are used then the appropriate persistence layer is invoked to passivate the objects managed by it); and (iv) all references to plain Java objects are eliminated (or "nulled") to permit garbage collection (step 308).

Figure 4:
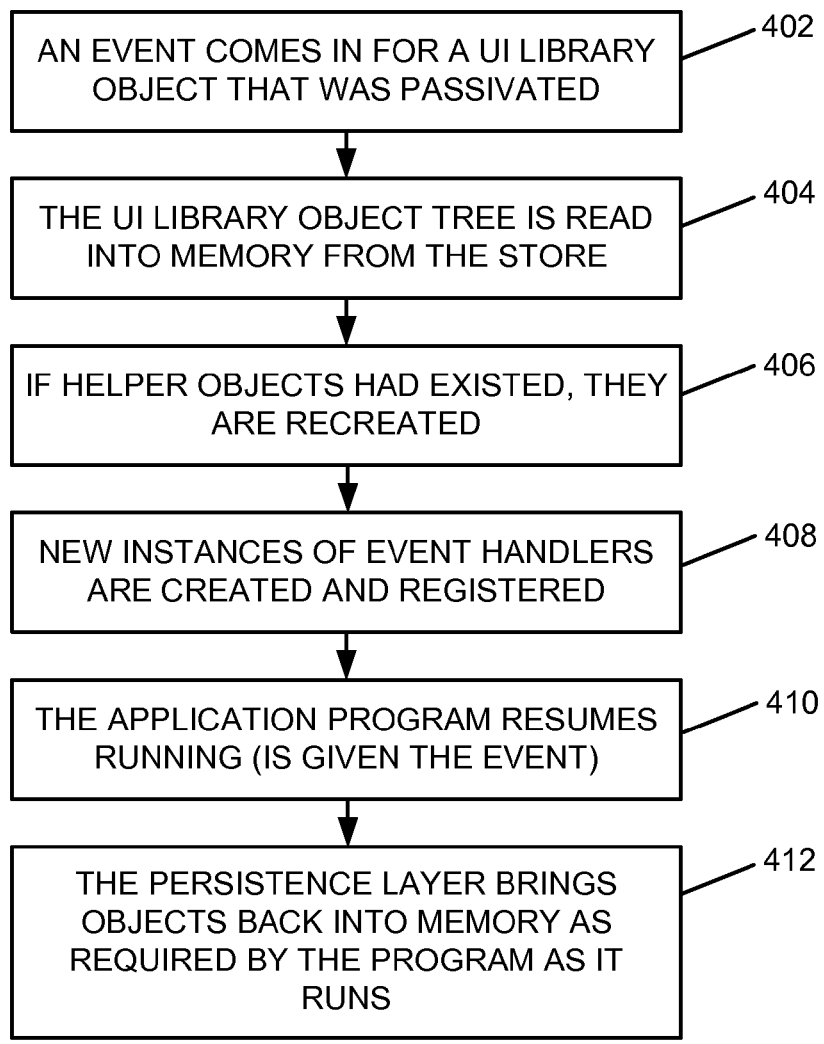

As shown in the flowchart 400 of FIG. 4, the following events take place when removed objects are reinstated into memory: (i) the AWT or SWT or other UI library objects are recreated (or "rebuilt") from state information stored in a file (or otherwise with the local client or on the server) when the web browser or the application program uses them (steps 402 and 404); (ii) if used, the helper object classes are rebuilt to store the AWT objects using the appropriate keys as described above (step 406); (iii) new instances of event handlers are created to process events from the stored AWT objects (step 408); and (iv) the J2EE objects are reactivated (step 410) by the J2EE container (or if other persistence methods are used then the appropriate persistence layer is invoked to activate the objects managed by it) (step 412).

The state of the AWT objects can be stored between user requests by either: (i) serializing them on a server disk drive; or (ii) storing them with the web browser client, in order to permit resumption of the state that existed just prior to inactivation. In the first method, the least recently used AWT objects are all "serialized" and stored to the server hard drive along with the Java objects that communicate with the web browser client. This can also be accomplished with web server "clustering mechanisms" using "containers" (such as Tomcat) that provide the state of a serialized object to all servers in the cluster, in order to support session scalability and failover responsibilities that are delegated to the web container, by storing the AWT object tree in the program execution session. In the second method, the state of the AWT objects is stored in the web browser between user requests while the server requests the client to supply the state information when the AWT objects are reactivated. The Java "peer object" classes on the web browser are serialized in response to this request and the serialized objects are then transferred to the server. The server then rebuilds the AWT and peer object hierarchies using suitable "builder object" classes and then reconnects the event handlers, thereby allowing a server to eliminate all AWT object hierarchies that are not frequently used. If a request for an eliminated hierarchy again materializes, the web server can request the client to provide all the state information needed to rebuild it. There is again support for session failover when a server in the cluster is inactivated, since another server can handle the user request by rebuilding the AWT hierarchy from the information supplied by the web client.

A key feature of the above-described passivation and reactivation schemes is the capability of separating all the "stateless" objects used by the application program from the AWT object classes by deregistering all event handlers, which is accomplished by mapping all AWT objects to their associated peer objects. However, the information regarding the event handler registered with each AWT object must not be lost when it is examined for removal. This can preferably be accomplished by identification of the peer object and its associated AWT object, in order to allow them to be mapped (along with the class of the stateless event handler object) at the time that each event handler is removed from an AWT object. When reactivation of the application program takes place, an instance of that class can be created and registered with the AWT object using the peer object having the same identification.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A system, comprising:
a memory; and
a processor programmed to:
provide access to a standalone application programmed in at least one of an object-oriented, an object-based, and a virtual-machine interpreted language, where the standalone application comprises a user interface that operates via a plurality of library commands that facilitate simultaneous operation of the user interface by a plurality of client computing devices;
allocate data elements used by the user interface in the memory in response to each request to initiate access to the standalone application received from the plurality of client computing devices;
provide the user interface of the standalone application to each of the plurality of client computing devices; and
temporarily remove the data elements associated with one of the plurality of client computing devices from the memory in response to determining that the data elements are not in use by the one of the plurality of client computing devices, where a portion of the memory allocated for the temporarily-removed data elements is temporarily made available for other tasks.

2. The system of claim 1, where the processor is further programmed to reclaim the portion of the memory temporarily made available for other tasks in response to determining that the data elements are again required by the one of the plurality of client computing devices.

3. The system of claim 1, where the standalone application is written using one of an abstract window toolkit, a simple widget toolkit, and another object-oriented toolkit to implement the plurality of library commands that facilitate simultaneous operation of the user interface by the plurality of client computing devices.

4. The system of claim 1 where the plurality of library commands are written in an abstraction language for displaying an output in a graphical interface of a browser associated with each of the plurality of client computing devices.

5. The system of claim 1, where the processor is further programmed to process, via the plurality of library commands, data contained in one or more user interface object classes accessed by the standalone application as parameters passed to at least one event handler object through use of one or more helper objects for storing a user interface object under an identification key.

6. The system of claim 5, where none of the one or more user interface object classes comprise main methods or variables and the at least one event handler object comprises a modifiable state.

7. The system of claim 5, further comprising a server disk drive and where the processor is further programmed to:
   store a user interface object by serialization on the server disk drive to permit resumption of a prior standalone application state;
   retrieve, in response to determining that the data elements are again required by the one of the plurality of client computing devices, the stored serialized user interface object from the server disk drive; and
   resume the prior standalone application state of the standalone application for the one of the plurality of client computing devices.

8. The system claim 5, where at least one user interface object is separated from an associated event handler object by use of mapping.

9. The system claim 1, where the at least one of the object-oriented, the object-based, and the virtual-machine interpreted language is selected from a group consisting of Java, Smalltalk, C++, C, Objective-C, Ruby, Python, Perl, PHP or C#.

10. The system of claim 9, where J2EE, Spring, JDO, JDBC or another middleware or persistence program or toolkit is used to scale the standalone application for conversion to a distributed application.

11. A method, comprising:
   providing, via a server, access to a standalone application programmed in at least one of an object-oriented, an object-based, and a virtual-machine interpreted language, where the standalone application comprises a user interface that operates via a plurality of library commands that facilitate simultaneous operation of the user interface by a plurality of client computing devices;
   allocating data elements used by the user interface in a memory in response to each request to initiate access to the standalone application received from the plurality of client computing devices;
   providing the user interface of the standalone application to each of the plurality of client computing devices; and
   temporarily removing the data elements associated with one of the plurality of client computing devices from the memory in response to determining that the data elements are not in use by the one of the plurality of client computing devices, where a portion of the memory allocated for the temporarily-removed data elements is temporarily made available for other tasks.

12. The method of claim 11, further comprising reclaiming the portion of the memory temporarily made available for other tasks in response to determining that the data elements are again required by the one of the plurality of client computing devices.

13. The method of claim 11, where the standalone application is written using one of an abstract window toolkit, a simple widget toolkit, and another object-oriented toolkit to implement the plurality of library commands that facilitate simultaneous operation of the user interface by the plurality of client computing devices.

14. The method of claim 11, where the plurality of library commands are written in an abstraction language for displaying an output in a graphical interface of a browser associated with each of the plurality of client computing devices.

15. The method of claim 11, further comprising processing, via the plurality of library commands, data contained in one or more user interface object classes accessed by the standalone application as parameters passed to at least one event handler object through use of one or more helper objects for storing a user interface object under an identification key.

16. The method of claim 15, wherein none of the one or more user interface object classes comprise main methods or variables and the at least one event handler object comprises a modifiable state.

17. The method of claim 15, further comprising:
   storing a user interface object by serialization on a server disk drive to permit resumption of a prior standalone application state;
   retrieving, in response to determining that the data elements are again required by the one of the plurality of client computing devices, the stored serialized user interface object from the server disk drive; and
   resuming the prior standalone application state of the standalone application for the one of the plurality of client computing devices.

18. The method of claim 15, where at least one user interface object is separated from an associated event handler object by use of mapping.

19. The method of claim 11, where the at least one of the object-oriented, the object-based, and the virtual-machine interpreted language is selected from a group consisting of Java, Smalltalk, C++, C, Objective-C, Ruby, Python, Perl, PHP or C#.

20. The method of claim 19, where J2EE, Spring, JDO, JDBC or another middleware or persistence program or toolkit is used to scale the standalone application for conversion to a distributed application.

* * * * *